May 7, 1963  L. J. PIANOWSKI  3,088,610
SKIP AND DELAYED DIP MECHANISM FOR CONVEYING APPARATUS
Filed April 7, 1960  4 Sheets-Sheet 2

INVENTOR.
Leon J. Pianowski
BY
Harness, Dickey & Pierce
ATTORNEYS

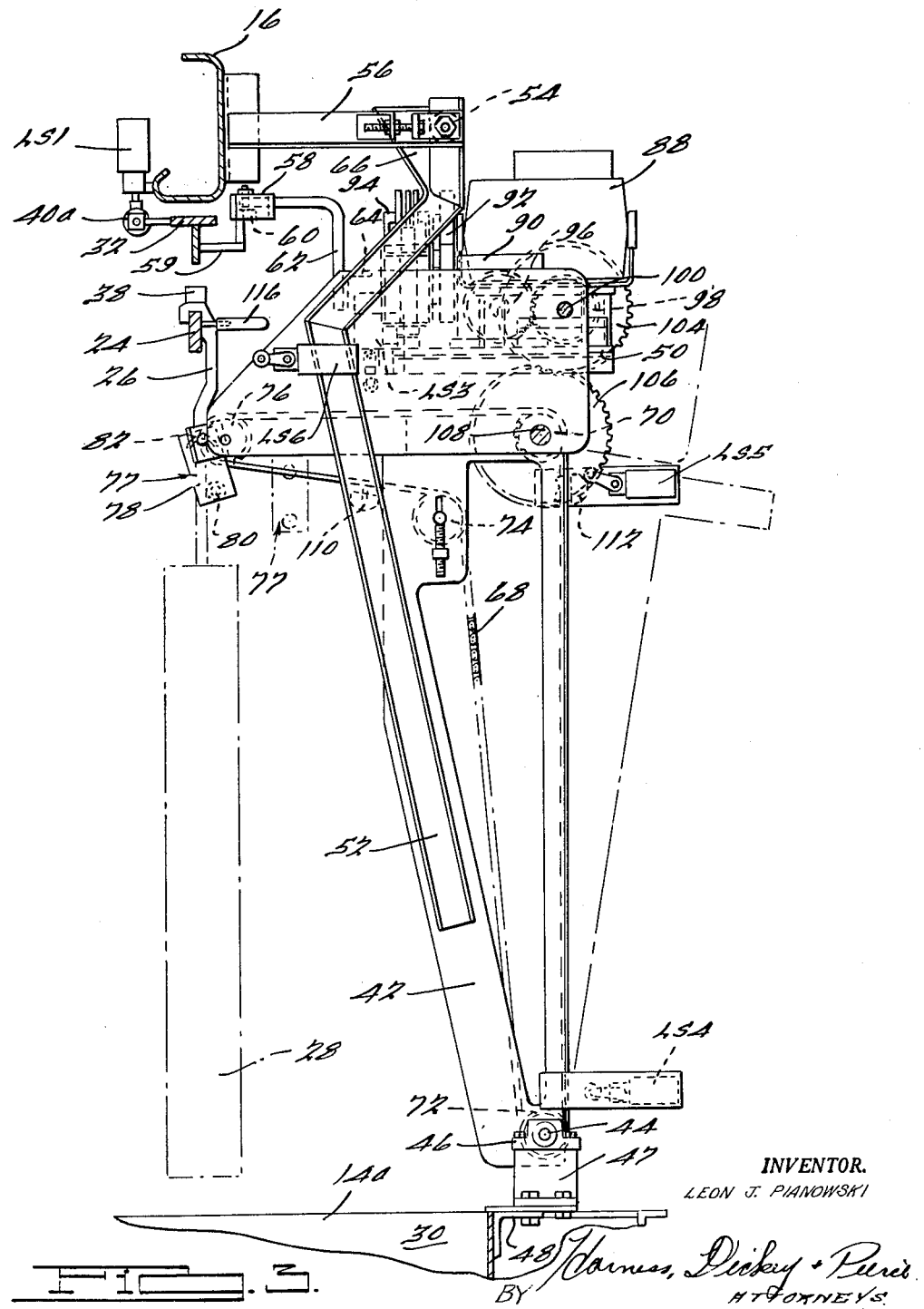

May 7, 1963 L. J. PIANOWSKI 3,088,610
SKIP AND DELAYED DIP MECHANISM FOR CONVEYING APPARATUS
Filed April 7, 1960 4 Sheets-Sheet 4
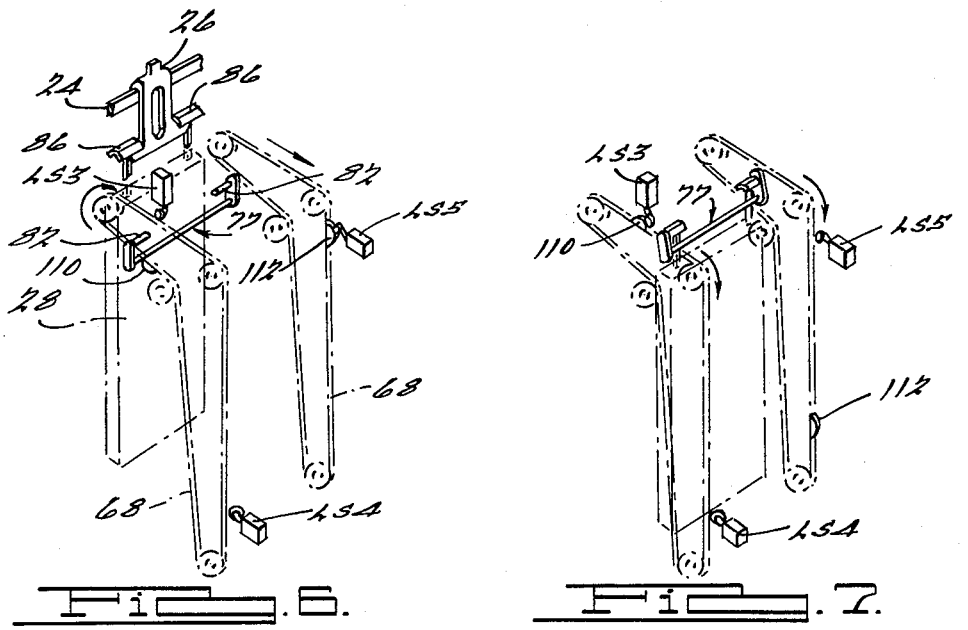
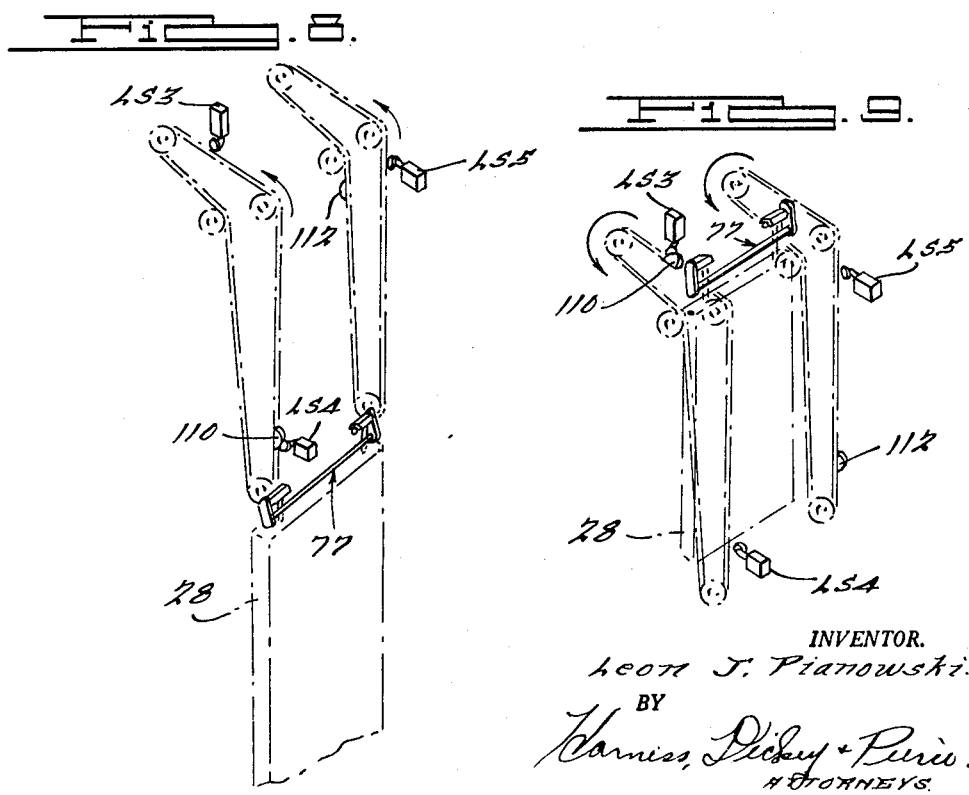
INVENTOR.
Leon J. Pianowski.
BY
Harness, Dickey & Pierce.
ATTORNEYS.

3,088,610
Patented May 7, 1963

3,088,610
SKIP AND DELAYED DIP MECHANISM FOR CONVEYING APPARATUS
Leon J. Pianowski, Detroit, Mich., assignor to The Udylite Corporation, Detroit, Mich., a corporation of Delaware
Filed Apr. 7, 1960, Ser. No. 20,609
12 Claims. (Cl. 214—89)

This invention broadly relates to conveying apparatus for transferring workpieces through a series of treating stations, and more particularly to a novel skip and delayed dip mechanism which can be mounted on and automatically coordinated with the operating sequence of the principal conveying apparatus.

The selective skid and delayed dip mechanism comprising the present invention is applicable to conveying machines of the general type disclosed in United States Patent Re. 24,072 issued October 11, 1955, originally United States Patent No. 2,650,600 issued September 1, 1953, and assigned to the same assignee as the present invention. In conveying machines of the general type disclosed in the aforementioned patent a plurality of workpieces are suspended from a supporting rail and conveyed thereon around a circuit usually having two straight side sections connected at one or both of their ends by an arcuate turnaround section. A reciprocable pusher type transfer mechanism intermittently advances the workpieces along the supporting rail through a series of treating stations which may comprise an aligned series of treating receptacles. As the workpieces are advanced along the supporting rail they are periodically lifted in order that they may be transferred over the partitions separating adjoining treating receptacles. The workpiece lifting means is generally comprised of an elevator chassis having an outer periphery substantially coextensive with the path of travel of the workpieces and movable in a vertical direction between a raised position and a lowered position. Sections of the workpiece-supporting rail are secured to the elevator chassis whereby workpieces suspended therefrom are lifted and lowered as the chassis is raised and lowered. In accordance with the operating function of the conveying machine the workpieces conveyed thereon are automatically and successively transferred through a predetermined treating sequence.

Continuous improvements and new developments in treating techniques coupled with rapid changes in product design have brought about an increasing need for conveying machines that are versatile and quickly adaptable to new treating sequences. It has also become desirable to enable selected ones of a plurality of workpieces to be automatically subjected to variations in the predetermined treating cycle to enable concurrent processing of a variety of parts. The foregoing problems have been partially overcome by incorporating in conventional conveying apparatus complex and cumbersome structure providing a limited degree of processing flexibility that is not only expensive to install and to maintain but that is difficult to modify and control.

Accordingly, it is a primary object of the present invention to provide a novel selective mechanism that can be simply and quickly installed at one or more treating stations of a conveying machine thereby providing processing versatility heretofore unobtainable in machines of similar type.

Another object of this invention is to provide a selective work-handling mechanism that is adaptable for simple installation in the field on conventional conveying machines and that can be simply integrated with the principal operating functions of the conveying machine.

Still another object of this invention is to provide a selective work-handling mechanism that is operable in response to actuation by presettable means on each of the work carriers enabling automatic delayed setdown and skip operation of selected workpieces at one or more treating stations of a conveying machine.

A further object of this invention is to provide a selective work-handling mechanism of compact design, durable operation, and economical manufacture that is quickly and simply mountable and demountable at one or more stations of a conveying machine requiring only minor structural modifications to the conveying machine.

The foregoing and other objects of this invention are achieved by a selective work-handling mechanism having a structure characterized by a pair of laterally spaced upstanding side members pivotally mounted at their lower ends to a reinforcing flange on the treating receptacles and which side members extend upwardly and are disposed adjacent to the work-supporting rail affixed to the vertically movable elevator chassis. Disposed between the upper portions of the upstanding side members are motor means drivingly connected to continuous flexible conveying means disposed along each of the side members having a lifting assembly extending therebetween and movable thereby. Actuation of the mechanism is achieved by presettable means on each of the work hangers during the elevating movement of the elevator chassis whereby the lifting assembly is effective to remove selected ones of the work racks suspended on the principal work-supporting rail and either maintain that rack in the elevated position for a skip operation while the elevator chassis is lowered, or to lower the work rack into the treating solution a predeterminable delay time period after the elevator chassis has been lowered. Suitable control means are employed to coordinate the operation of the selective work-handling mechanism with the operating function of the principal conveying machine enabling skip or delayed dip operation at one or more treating stations of the conveying machine.

Other objects and advantages of the present invention will become apparent from the following detailed description taken in conjunction with the accompanying drawings wherein:

FIG. 3 is a side elevation view of the selective work-handling mechanism shown in FIG. 2;

FIG. 4 is a fragmentary plan view of the reciprocating cam affixed to the pusher bar as shown in FIGS. 2 and 3;

FIG. 5 is an enlarged fragmentary elevation view of a typical cam actuating mechanism for pivoting the pushers to an inoperative position; and FIGS. 6–9 are diagrammatic perspective views of the selective work-handling mechanism illustrating the operating sequence thereof.

Figure 1:
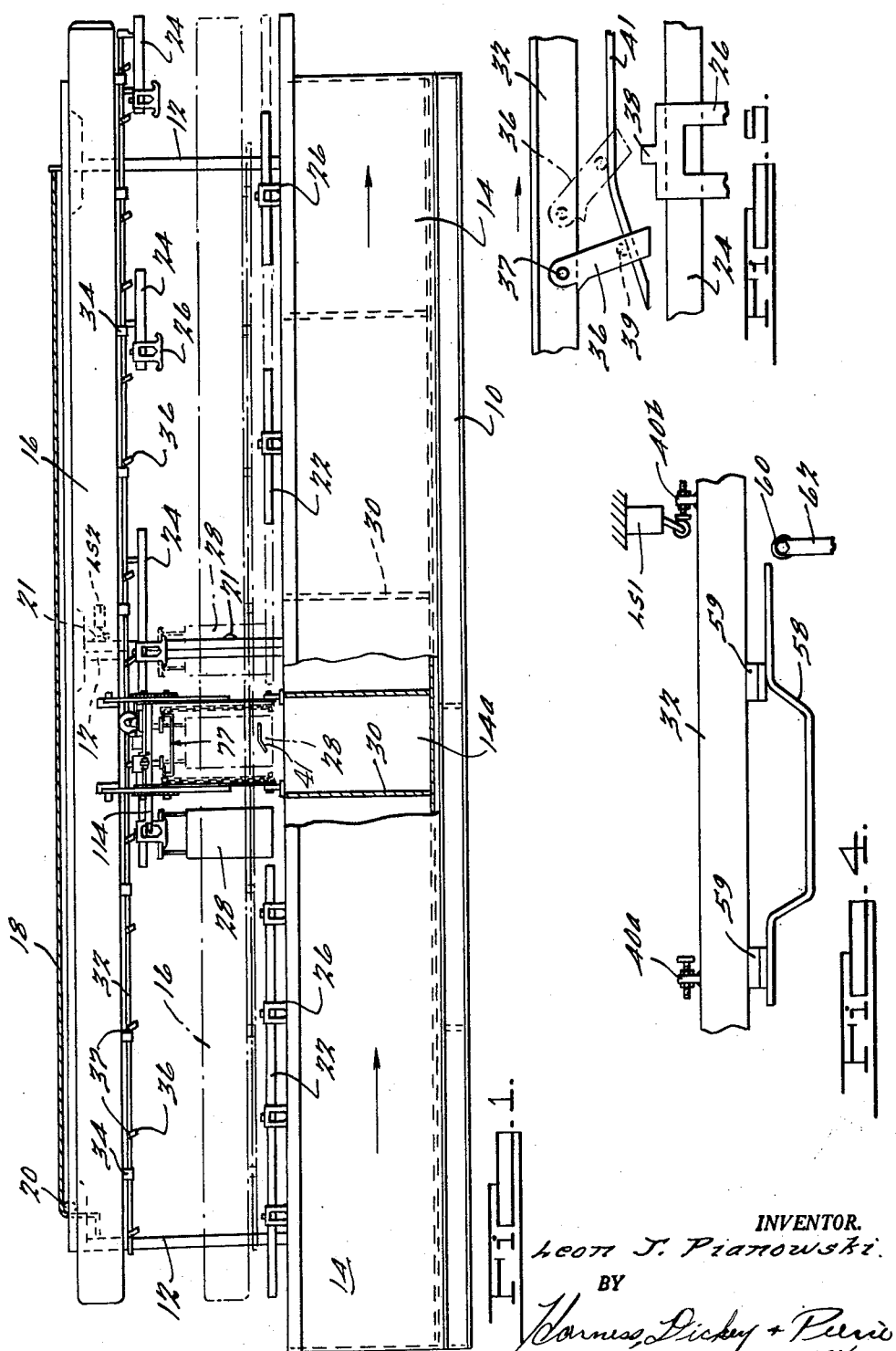
FIGURE 1 is a front elevation view of a conveying machine incorporating therein a selective work-handling mechanism installed in accordance with the preferred practice of this invention.

Referring now in detail to the drawings, and as may be best seen in FIGURE 1, a typical conveying machine to which the present invention is applicable comprises a central frame including base beams 10 on which a series of longitudinally spaced upright columns 12 are rigidly affixed. Supported on base beams 10 and extending around upright columns 12 is an aligned series of treating receptacles 14 containing solutions in which the workpieces are sequentially immersed. An elevator chassis 16 is mounted for vertical movement on upright columns 12 and is suspended by cable 18 coacting with rotatably mounted rollers 20. Raising and lowering of the elevator chassis 16 to and from the raised position as shown in solid lines in FIGURE 1 to the lowered position shown in phantom is achieved by a double acting hydraulic lift cylinder (not shown) connected to the cable 18. The movement of the elevator chassis 16 and lift cylinder is controlled by a suitable limit switch LS2 mounted on the chassis and adapted to be tripped by cams 21 affixed to center column 12 when the chassis attains the fully elevated position or fully lowered position.

A series of aligned fixed rail sections 22 are rigidly secured by suitable brackets to the central frame and are positioned directly over the treating receptacles 14. A series of vertically movable rail sections 24 are secured to the underside of the elevator chassis 16 and are raised and lowered as the chassis is raised and lowered. When the elevator chassis 16 is in the lowered position the fixed rail sections 22 and the vertically movable sections 24 are aligned forming a continuous rail around the machine on which a plurality of work hangers 26 are movably mounted and intermittently advanced therealong in the direction of the arrows. Suitable work racks 28 are suspended from the work hangers 26 and are sequentially immersed in the treating solutions contained in the treating receptacles 14. The work racks and workpieces thereon can be electrified by any one of the means well known in the art to provide for an electrochemical or electroplating treatment at selected treating stations. The work hangers 26 are periodically lifted by the vertically movable rail sections connected to the elevator chassis 16 in order that the work racks 28 suspended therefrom can be transferred over partitions 30 separating adjoining treating receptacles 14.

The intermittent movement of the work hangers 26 along the straight side portions of the conveying machine is achieved by a reciprocable pusher transfer mechanism comprising a pusher bar 32 of a T-shaped cross section slidably mounted in shoes 34 affixed to the underside of the elevator chassis 16. The pusher bar 32 is provided with a plurality of longitudinally spaced pushers 36 pivotally mounted on pins 37 affixed to the pusher bar 32 and adapted to engage a projection 38 on the upper portion of the work hangers 26. Each of the pushers 36 incorporates a suitable stop thereon which is adapted to engage the pusher bar on the advancing movement of the pusher mechanism holding the pusher from pivoting at this time. During the retracting movement of the pusher bar 32 the pushers 36 pivot upwardly into an inoperative position whenever they are retracted across the top of a work hanger 26 on the supporting rail. Advancement of the work hangers 26 along the arcuate end sections of the supporting rail is achieved by rotatably mounted pusher arms (not shown) which are actuable in response to the reciprocating movement of the pusher bar 32.

The reciprocating travel of the pusher mechanism is controlled by a suitable limit switch LS1 mounted on the chassis and tripped by actuators on the pusher bar when it attains its fully advanced or its fully retracted position. A suitable system is shown diagrammatically in FIG. 4 comprising actuators 40a and 40b adjustably affixed to the pusher bar 32 and operative to trip limit switch LS1 when fully advanced or fully retracted positions are attained. The pusher bar is shown in FIG. 4 in the fully retracted position wherein limit switch LS1 has been tripped by actuator 40b. Tripping of the limit switch LS1 is effective to control a suitable pneumatic or hydraulic double acting transfer cylinder connected to the pusher bar 32. The reciprocable pusher mechanism is operated through an advancing stroke when the chassis is in the fully raised position and when it is in the fully lowered position. Retraction of the pusher bar 32 is generally achieved during the vertical travel of the elevator chassis between the raised and lowered positions. It will be apparent from FIGURE 1 that when the chassis is in the raised position only the work hangers 26 on the vertically movable rail sections 24 are advanced. On the other hand, when the elevator chassis 16 is in the lowered position all of the work hangers 26 on the fixed rail sections 22 and vertically movable rail sections 24 are advanced. Certain ones of the pushers 36 which are disposed adjacent to single station tanks such as treating receptacle 14a are provided with a lug 39 extending rearwardly therefrom and coacting with a cam 41 fixedly secured to the central frame operative to lift the pusher 36 to the inoperative position as shown in phantom in FIG. 5 on the advancing stroke of the pusher bar 32. Pivoting of the pusher 36 about the pin 37 to the inoperative position when the pusher bar 32 is advanced from the fully retracted position as shown in FIG. 5 in the direction of the arrow prevents the pusher from engaging the projection 38 on the top of the work hanger 26 positioned on rail 24 at a single station treating receptacle. This arrangement is required to prevent advancing a work hanger at a single station receptacle when the chassis is in the lowered position which would otherwise cause the work rack 28 suspended therefrom to clash against a partition 30 of the next adjoining treating receptacle. Accordingly, advancement of the work hangers 26 to and from position over a single station treating receptacle is accomplished only when the elevator chassis 16 is in the elevated position.

It will of course be appreciated that alternate work advancing means such as, for example, an intermittently driven chain drive, can be satisfactorily used with the present invention in lieu of the reciprocable pusher mechanism hereinabove described.

The operation of the conveying machine is in accordance with that shown and described in the above mentioned patent to which reference is made for a more detailed description of the various operating components. The machine hereinabove described and shown in the drawings is of the turnaround type wherein the workpieces travel a circuitous path from the loading station to the unloading station. It will also be appreciated by those skilled in the art that the selective work-handling or skip and delayed dip mechanism comprising the present invention is equally applicable to machines of the straight-through type employing a vertically movable elevator chassis for lifting the workpieces.

One or more selective skip and delayed dip mechanisms comprising the present invention may be installed at selected positions along the path of travel of the workpieces. For the purposes of description, only one such mechanism has been incorporated in the machine herein disclosed and is shown in FIGURE 1 positioned above the single station treating receptacle 14a. As may be best seen in FIGS. 2 and 3 the selective skip and delayed dip mechanism is comprised of a pair of laterally spaced side members 42 pivotally mounted at their lower ends on pins 44 which are rotatably journaled in bearing blocks 46 detachably secured to upstanding brackets 47 mounted on an angle iron reinforcing stringer 48 affixed to the outer edge of the treating receptacle 14a. The treating receptacle 14a is extended outwardly between the upstanding brackets 47 beyond the side partitions of the treating receptacles 14 as shown in FIG. 3 a distance sufficient to provide adequate clearance of the work rack lowered into the treating receptacle 14a by the selective skip and delayed-dip mechanism. A platform 50 is disposed between and rigidly affixed to the upper portions of side members 42 providing a mounting base for a reversible drive mechanism. Each of the outer side surfaces of side members 42 is provided with a U-shaped channel track 52 having a generally Z-shaped configuration in which rollers 54 adjustably mounted on brackets 56 secured to the side of the elevator chassis 16 are in engaging rolling contact. The coaction between the rollers 54 and the channel tracks 52 imparts a pivoting movement of the skip and delayed dip mechanism about pivot pins 44 as the elevator chassis 16 is raised and lowered. The pivotal movement of the skip and delayed dip mechanism between the innermost position shown in solid lines and the extreme outermost position as shown in phantom in FIG. 3 enables unobstructed vertical movement of the elevator chassis 16, the work hangers 26, and work racks 28 suspended thereon. When the elevator chassis 16 is in the fully elevated position the skip and delayed dip mechanism by virtue of the gravitational force on the inwardly overhanging structure causes the mechanism to assume the position shown in solid lines in FIG. 3. In that position the inwardly projecting portion of the side members 42 are disposed immediately contiguous to the path of travel of the work hangers 26 on the vertically movable rail sections 24.

To prevent interference between the inwardly projecting portion of the skip and delayed dip mechanism and a work hanger 26 during the advancing movement of the reciprocating pusher bar 32, a longitudinally disposed cam 58 detachably secured by suitable L-shaped brackets 59 to the pusher bar 32 and reciprocable thereby is employed which coacts with a cam follower 60 rotatably mounted on a bracket 62 secured to a lateral brace 64 extending between side members 42. As may be best seen in FIGS. 3 and 4, the coaction between the cam follower 60 and cam 58 causes the skip and delayed dip mechanism to pivot outwardly a distance sufficient to avoid conflict with work hanger 26 being advanced to and from the treating station adjacent to the skip and delayed dip mechanism during the advancing stroke of the pusher bar 32. To enable the outwardly cammed pivotal motion of the skip and delayed dip mechanism during the advancing stroke of the pusher bar 32, the upper end portions of the channel tracks 52 are provided with diverging Y-shaped sections 66 permitting restricted lateral movement of the rollers 54 relative to the channel tracks 52.

A continuous conveyor link chain 68 of an inverted L-shaped loop configuration is disposed inwardly and substantially parallel to each of the inner faces of the side members 42. The link chains 68 extend over and are in continuous engagement with drive sprockets 70, lower idler sprockets 72, adjustable idler sprockets 74, and forward idler sprockets 76, all of which are rotatably mounted on shafts secured to side members 42. A suitable lifting assembly 77 comprising a pair of end plates 78 connected together by a stabilizer bar 80 and incorporating a pair of inwardly extending tubular lugs 82 is pivotally mounted at each end to L-shaped clips 84 fastened to one of the links of each of the link chains 68. The tubular lugs 82 are adapted to engage the concave underside of the outer portions of angle iron hanger brackets 86 on the work rack 28 so as to pick up or deposit the work racks 28 on the work hangers 26. It will of course, by appreciated by those skilled in the art that the lifting assembly 77 may be modified to adapt it to any particular work rack and work hanger configuration.

Movement of the link chains 68 is achieved by a drive mechanism supported on the platform 50 comprising a reversible electric motor 88 which is drivingly connected to a speed reducer 90 by a flexible belt 92. A suitable drum brake 94 is fixedly mounted on the input shaft of the speed reducer 90 providing a braking action to stop the drive mechanism on de-energization of the motor 88 preventing any overrun due to the inertia of the moving parts. A drive pinion 96 is affixed to the output shaft of the speed reducer 90 and is in constant mesh with pinion 98 affixed to a transverse shaft 100 extending between and rotatably journaled through end bearings 101 affixed to the side members 42. A suitable pillow block bearing 102 is disposed adjacent the pinion 98 rotatably supporting the transverse shaft 100 at an intermediate position. The end portions of the transverse shaft 100 extending beyond bearings 101 are provided with drive pinions 104 affixed thereto. Drive pinions 104 are in constant mesh with driven pinions 106 which are affixed to shafts 108 rotatably mounted in side members 42 and having drive sprockets 70 affixed to the other ends thereof. The transverse shaft 100 in addition to transferring the rotative force of the reversible motor 88 to the link chains 68 also serves to synchronize the movement of the link chains 68 thereby assuring that the work rack lifting assembly 77 is maintained in appropriate longitudinal alignment with the vertically movable rail section 24 on the principal conveying machine.

Figure 2:
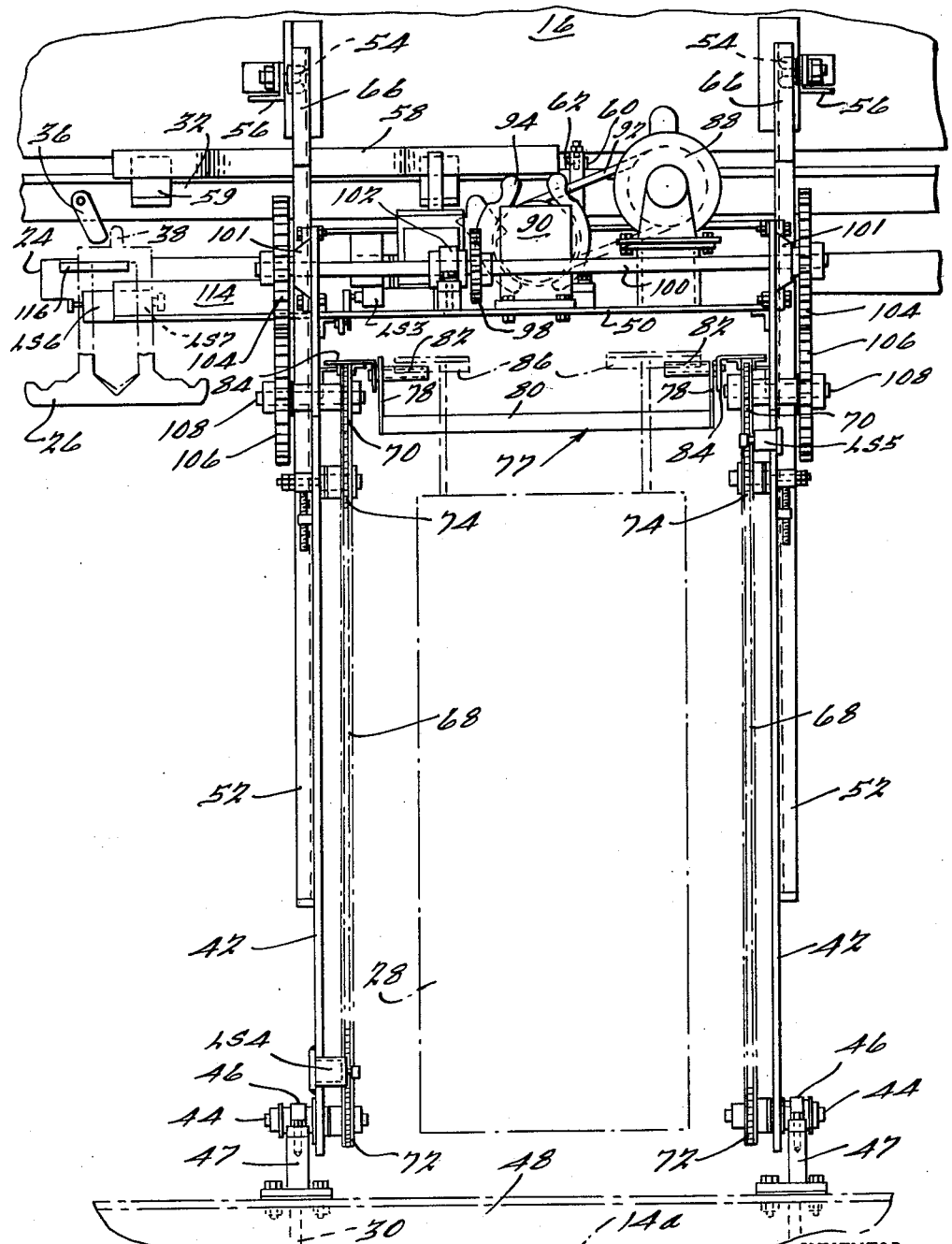
FIG. 2 is an enlarged front elevation view of the selective work-handling mechanism shown in FIGURE 1 and incorporating the preferred embodiments of this invention.

By alternately reversing the direction of rotation of the electric motor 88 the link chains 68 and the lifting assembly 77 thereon are caused to travel through a controlled displacement whereby a work rack 28 is picked up off a work hanger 26 and thereafter deposited on that hanger in accordance with an automatic predetermined cycle which will be subsequently described in detail. The displacement through which the link chains 68 travel is suitably controlled by a series of limit switches LS3, LS4, and LS5 as shown in FIGS. 2 and 3. Limit switches LS3 and LS4 are disposed adjacent to the path of travel of link chain 68 at the left of the skip and delayed dip mechanism as viewed in FIG. 2 and are actuable by a cam actuator 110 affixed to one of the links of the chain. Limit switch LS5 is fixedly mounted on a suitable bracket and is disposed adjacent to the path of travel of the link chain 68 at the right side of the skip and delayed dip mechanism as viewed in FIG. 2. The tripping of limit switch LS5 is achieved by a cam actuator 112 affixed to one of the links of the chain. The specific function and operating sequence of the limit switches LS3, LS4, and LS5 will be subsequently described in detail.

The activation of the skip and delayed dip mechanism is automatically achieved in the preferred practice of this invention by presettable means on each of the work hangers 26 which may be selectively positioned to alternately miss or trip either a delayed dip selector limit switch LS6 or a skip selector limit switch LS7 during the elevating movement of the elevator chassis 16. As will be noted in FIGS. 2 and 3, limit switches LS6 and LS7 are disposed adjacent to each other and are affixed to a lateral brace 114 secured to the side member 42. The presettable means on each of the work hangers 26 can be comprised of a trip lever 116 pivotally mounted on the work hanger 26 and selectively positionable by a workman at the loading station to alternatively provide a skip, a delayed dip, or a normal treating sequence in accordance with the type of workpieces on the work rack 28. The trip lever 116 when in either of the two operative positions is disposed in vertical alignment with either limit switch LS6 or LS7 and is effective to trip the appropriate selector switch during the vertical elevating movement of the elevator chassis 16.

In operation, the treating sequence that a particular work rack 28 is to undergo is established at the time the rack is loaded on the principal conveying machine and at which time the tripping lever 116 on the work hanger 26 is moved to the appropriate position. Thereafter, the rack is intermittently advanced along the fixed rail sections 22 and vertically movable rail sections 24 until it is positioned adjacent to single station tank 14a (FIGURE 1). With the elevator chassis 16 in the lowered position the reciprocable work transfer mechanism is actuated transferring the work hanger and work rack suspended therefrom to the first position on the vertically movable rail section 24 disposed adjacent to the selective skip and delayed dip mechanism. The elevator chassis is then raised during which movement the skip and delayed dip mechanism is pivoted outwardly out of vertical alignment with the elevator chassis so as not to obstruct the vertical movement of the elevator chassis. When the tripping lever 116 is positioned in the delay setdown position, limit switch LS6 is tripped thereby during the upper portion of the elevating movement of the elevator chassis 16. The tripping of limit switch LS6 signals the control circuit of the skip and delay setdown mechanism that the work rack suspended on that work hanger is to undergo a delayed dip treating sequence. When the elevator chassis 16 attains the fully elevated position chassis control limit switch LS2 is tripped signalling the principal control circuit of the conveying machine whereby the transfer cylinder is energized causing the pusher bar 32 to commence its advancing stroke. During the advancing movement of the pusher bar 32 the cam follower 60 contacts cam 58 causing the skip and delayed dip mechanism to pivot outwardly preventing interference between the work hanger and work rack as it moves into position above the treating receptacle 14a and adjacent to the delayed dip mechanism. Toward the completion of the advancing movement of the pusher bar 32 the cam follower 60 rides down the lowering ramp portion of the cam 58 whereby the skip and delayed dip mechanism again pivots inwardly in position to pick up the work rack off the work hanger. At the completion of the advancing movement of the pusher bar 32 the limit switch LS1 is tripped by actuator 40a on the pusher bar signalling the control circuit of the skip and delayed dip mechanism that the work rack is in position to be picked off the work hanger.

The ensuing operating sequence of the skip and delayed dip mechanism may be best described with reference to FIGS. 6 through 9. At the instant the reciprocating pusher bar attains the fully advanced position tripping limit switch LS1, the lifting assembly 77 and link chain 68 are in the position shown in FIG. 6. The electric motor 88 in the reversible drive mechanism is then energized causing the lifting assembly 77 to travel from the position shown in FIG. 6 in the direction of the arrows to the position shown in FIG. 7 and during which movement the tubular lugs 82 of the lifting assembly engage the outer portions of hanger brackets 86 on the work rack lifting it from the work hanger 26. Movement of the lifting assembly 77 and work rack suspended therefrom is stopped when cam actuator 110 trips limit switch LS3 de-energizing the electric motor 88 and energizing drum brake 94. The actuation of limit switch LS3 simultaneously signals the control circuit of the principal conveying machine that the pickup operation has been completed whereby the lift cylinder is actuated causing the elevator chassis to be lowered to the lowered position. The tripping of the limit switch LS3 by cam actuator 110 also energizes a suitable delay dip dwell timer in the control circuit of the skip and delayed dip mechanism starting it to time. When the elevator chassis 16 attains the lowered position chassis control limit switch LS2 is tripped by lower cam 21 which energizes a suitable dwell timer in the principal control circuit of the conveying machine which commences timing a predetermined dwell period. At the completion of the timing period of the principal dwell timer, the transfer cylinder is energized causing the pusher bar to start its advancing stroke whereby the work hangers 26 positioned in multiple station treating receptacles are advanced to the next adjacent treating station. As hereinbefore mentioned, the work hanger from which the work rack had been removed by the skip and delayed dip mechanism is not advanced during the down transfer movement of the reciprocable pusher mechanism by virtue of camming the pusher adjacent thereto to the inoperative position in the manner shown in FIG. 4. At the completion of the advancing movement of the pusher bar, limit switch LS1 is tripped by actuator 40a signalling the control circuit of the principal machine that the elevator chassis is ready to be raised.

During the foregoing operating sequence of the principal conveying machine, namely, the lowering of the chassis, the workpiece immersion dwell period, and the advancing stroke of the pusher bar, the skip and delayed dip mechanism undergoes an independent and automatic predetermined cycle as controlled by the delayed dip timer down dwell period has been completed. This is the delayed dip timer energizes electric motor 88 whereby the lifting assembly 77 and work rack suspended therefrom are moved from the position shown in FIG. 7 in the direction of the arrows to the down position shown in FIG. 8 immersing the work rack 28 in the treating receptacle 14a. The downward movement of the lifting assembly 77 is halted when limit switch LS4 is tripped by cam actuator 110 de-energizing the electric motor 88 and energizing the drum brake 94. The delayed dip dwell timer continues to time out a preselected down position dwell period upon the expiration of which the dwell timer signals the control circuit of the principal conveying machine and the control circuit of the skip and delayed dip mechanism that the work rack is ready to be raised out of treating receptacle 14a. Before the elevator chassis 16 is raised and before the electric motor 88 on the skip and delayed dip mechanism is energized to lift the work rack, three events must occur to assure that the principal conveying machine and skip and delayed dip mechanism have completed their respective functions. These events are: the completion of the down transfer movement of the pusher bar as signalled by limit switch LS1; the attainment of the down position as signalled by limit switch LS4; and that the delayed dip timer down dwell period has been completed. This is achieved by an interlocking circuit including limit switch LS1, limit switch LS4 and the delayed dip dwell timer of the skip and delayed dip mechanism. When all three of these conditions are satisfied the control circuit of the principal conveying machine and control circuit of the skip and delayed dip mechanism are energized whereby the elevator chassis 16 commences its elevating movement and the electric motor 88 on the skip and delayed dip mechanism is energized moving the lifting assembly 77 and work rack 28 suspended therefrom from the position shown in FIG. 8 in the direction of the arrows to the position shown in FIG. 9. During that movement the work rack 28 is withdrawn from the treating receptacle 14a and stopped in the standby position shown in FIG. 9 when the electric motor is de-energized by the actuation of limit switch LS3 by cam actuator 110. When the elevator chassis 16 attains the fully elevated position limit switch LS2 is actuated by upper cam 21 signalling the control circuit of the skip and delayed dip mechanism that the work hanger is in position to receive the work rack 28 on the lifting assembly 77. Limit switches LS2 and LS3 are interlocked and when both have been tripped, the electric motor 88 is re-energized to move the lifting assembly 77 from the position shown in FIG. 9 in the direction of the arrows to the original position as shown in FIG. 6. During the latter movement the work rack 28 is redeposited on the work hanger 26 and the lifting assembly 77 is stopped when the cam actuator 112 trips limit switch LS5. In addition to de-energizing electric motor 88, limit switch LS5 also signals the control system of the principal conveying machine that the work rack has been deposited on the work hanger and the reciprocable pusher bar commences its advancing stroke. During the advancing movement of the pusher bar as heretofore described, the skip and delayed dip mechanism is cammed outwardly by cam 58 to provide clearance of the work hanger and redeposited rack as they are advanced along the vertically movable rail to the next adjacent treating station.

In accordance with the delayed dip treating cycle hereinabove described and by virtue of the adjustability of the delayed dip dwell timer, an immersion period of the work rack in treating receptacle 14a can be obtained ranging from a short duration dip to an immersion period approaching that provided by the principal conveying machine. In the preferred practice of this invention the expiration of the down dwell period of the delayed dip timer is set to expire concurrently with the completion of the advancing stroke of the reciprocable pusher bar on the elevator chassis whereupon the skip and delayed dip mechanism and principal conveying machine simultaneously become ready for the next operating step. Accordingly, the total down dwell period is established by regulating the delay dwell period with allowance for the time required to lower the work rack from the position shown in FIG. 7 to the down position shown in FIG. 8.

Skip operation of the skip and delayed dip mechanism provides an alternative treating sequence whereby the work rack removed from the principal conveying machine is completely omitted from treatment in treating receptacle 14a. A selected work rack scheduled for a skip operation is automatically processed through that sequence when the operator positions the trip lever 116 on the work hanger 26 to the skip position. The trip lever 116 actuates the skip selector limit switch LS7 during the elevating movement of the chassis as the work hanger is lifted from the multiple station treating receptacle adjacent to single station tank 14a. After the completion of the advancing movement of the reciprocable pusher bar which is signalled by limit switch LS1, the work rack 28 is removed from the elevated work hanger 26 in accordance with the movement of the lifting assembly from the position shown in FIG. 6 in the direction of the arrow to the position shown in FIG. 7. When limit switch LS3 is tripped by cam actuator 110 the lifting assembly 77 and work rack suspended therefrom stop and remain in that position until the elevator chassis descends and the principal conveying machine completes its down dwell period, forward advancing movement of the pusher bar, and again ascends to the elevated position. When the elevator chassis 16 reaches the fully raised position, the limit switch LS2 is tripped signalling the skip and delayed dip mechanism that the work hanger is in position for receiving the work rack and the motor 88 is energized so as to move the lifting assembly 77 from the position shown in FIG. 9 in the direction of the arrows back to the original position shown in FIG. 6. When limit switch LS5 is tripped by cam actuator 112, the control circuit of the principal conveying machine is signalled whereby the pusher bar commences its advancing movement advancing the work hanger to the next adjacent treating station.

In normal operation of the principal machine and the skip and delayed dip mechanism it often occurs that successive adjacent work hangers will each have their respective trip levers 116 in the operative position. Inasmuch as the selective delayed dip or skip treating cycle on the first work hanger is not completed at the time the second work hanger trips either the delayed dip selector switch LS6 or skip selector switch LS7, a memory circuit of the type well known in the art is incorporated in the control circuit of the skip and delayed dip mechanism whereby the signal of selective treatment for the second hanger is memorized until the initial treating cycle is completed. It will also be appreciated by those skilled in the art that the versatility and processing flexibility obtained by one skip and delayed dip mechanism can be multiplied by incorporating two or more units at the various single station tanks along the path of travel of the work racks. Each of the control circuits of the additional skip and delayed dip mechanisms are interlocked with the control circuit of the principal conveying machine and first skip and delayed dip mechanism whereby the operating function of all the components is integrated.

While it will be apparent that the preferred embodiments herein illustrated are well calculated to fulfil the objects above stated, it will be appreciated that the invention is susceptible to modification, variation and change without departing from the proper scope or fair meaning of the subjoined claims.

What is claimed is:

1. In a conveying machine, the combination comprising a frame, rail means on said frame movable to and from a raised position and a lowered position, work-supporting means movably mounted on said rail means, advancing means for advancing said work-supporting means along said rail means, a selective work-handling means disposed adjacent to said rail means for selectviely removing and depositing said work-supporting means on said rail means, means associated with said rail means coacting with and for moving said selective work-handling means out of the path of said rail means during the up and down movement thereof, cam means on said advancing means coacting with and for moving said selective work-handling means out of the path of travel of said work-supporting means during the advancing stroke of said advancing means, said selective work-handling means selectively actuable in response to the vertical movement of selected ones of said work-supporting means.

2. In a conveying machine, the combination comprising a frame, rail means on said frame movable to and from a raised position and a lowered position, work-supporting means movably mounted on said rail means, pusher means for advancing said work-supporting means along said rail means, a selective work-handling means disposed adjacent to said rail means for selectively removing and depositing said work-supporting means on said rail means and for selectively and independently raising and lowering said work-supporting means, means associated with said rail means coacting with and for moving said selective work-handling means out of the path of said rail means during the up and down movement thereof, cam means on said pusher means coacting with and for moving said selective work-handling means out of the path of travel of said work-supporting means during the advancing stroke of said pusher means, said selective work-handling means selectively actuable in response to the elevating movement of selected ones of said work-supporting means.

3. In a conveying machine, the combination comprising a frame, rail means on said frame movable to and from a raised position and a lowered position, work-supporting means movably mounted on said rail means, pusher means for advancing said work-supporting means along said rail means, a framework movably mounted adjacent to said rail means and guidably connected to means associated with said rail means, conveying means on said framework having a portion thereof disposed contiguous to said rail means when in said raised position for removing and selectively and independently lowering and raising selected ones of said work-supporting means and redepositing said work-supporting means on said rail means, reversible motor means on said framework for driving said conveying means, means on said framework coacting with cam means on said pusher means for moving said framework out of the path of travel of said work-supporting means along said rail means during the advancing stroke of said pusher means, said conveying means operable in response to means on said framework actuable by selected ones of said work-supporting means during the elevating movement thereof, and control means for coordinating the operating sequence of said conveying machine.

4. In a conveying machine, the combination comprising a frame, rail means on said frame movable to and from a raised position and a lowered position, work-supporting means movably mounted on said rail means, pusher means for advancing said work-supporting means along said rail means, an upright framework pivotally mounted at the base thereof and disposed laterally of and adjacent to said rail means, coacting means on said framework and said rail means for guiding and laterally pivoting said framework as said rail means are raised and lowered, roller means on said framework coacting with cam means on said pusher means for laterally pivoting said framework outwardly out of the path of travel of said work-supporting means along said rail means when in the raised position during the advancing stroke of said pusher means, flexible conveying means on said framework having lifting means thereon adapted to engage selected ones of said work-supporting means on said rail means, reversible motor means for driving said flexible conveying means and lifting means thereon so as to remove and selectively and independently lower and raise selected ones of said work-supporting means and redeposit said work-supporting means on said rail means, said motor means selectively operable in response to means on said framework actuable by presettable means on said work-supporting means during the elevating movement thereof.

5. In a conveying machine, the combination comprising a frame, rail means on said frame movable to and from a raised position and a lowered position, work-supporting means movably mounted on said rail means, pusher means for advancing said work-supporting means along said rail means, an upright framework pivotally mounted at the base thereof and disposed laterally of and adjacent to said rail means, roller means associated with said rail means coacting with track means on said framework for guiding and laterally pivoting said framework out of the path of travel of said rail means during the up and down movement thereof, roller means on said framework coacting with cam means on said pusher means for laterally pivoting said framework outwardly out of the path of travel of said work-supporting means along said rail means when in the raised position during the advancing stroke of said pusher means, flexible conveying means on said framework having lifting means thereon adapted to engage selected ones of said work-supporting means on said rail means, reversible motor means for driving said flexible conveying means and lifting means thereon so as to remove and selectively and independently lower and raise selected ones of said work-supporting means and redeposit said work-supporting means on said rail means, said motor means selectively operable in response to means on said framework actuable by presettable means on said work-supporting means during the elevating movement thereof, and control means for coordinating the operating sequence of said conveying machine.

6. In a conveying machine, the combination comprising a frame, an elevator chassis mounted on said frame and movable to and from a raised position and a lowered position, a series of aligned rail means portions thereof carried by said chassis and movable thereby, a plurality of work racks movably mounted on said rail means, pusher means on said chassis for advancing said work racks along said rail means, an upright framework pivotally mounted at its base and disposed adjacent to said chassis and contiguous to said rail means thereon, roller means on said chassis coacting with track means on said framework for laterally pivoting said framework out of the path of travel of said chassis during the up and down movement thereof, a cam follower on said framework coacting with a longitudinally disposed cam on said pusher means for laterally pivoting said framework outwardly out of the path of travel of said work racks on said movable portions of said rail means when in the raised position during the advancing movement of said pusher means, a plurality of sprockets rotatably mounted on said framework, continuous chain means extending around said sprockets, lifting means on said chain means for engaging selected ones of said work racks, reversible motor means on said framework for driving said chain means to cause said lifting means to remove a selected one of said work racks from said rail means when in the raised position and for selectively and independently lowering and raising said selected rack and repositing said rack on said rail means after said chassis has been lowered and again elevated to the raised position, said motor means selectively operable in response to means on said framework actuable by presettable means on said work racks during the elevating movement thereof.

7. In a conveying machine for successively conveying a plurality of work racks through a series of treating stations including an elevator chassis movable to and from a raised position and a lowered position over the treating stations, an alignable series of rail sections including movable sections carried by the chassis having a plurality of work racks movably mounted thereon, and pusher means on the chassis for advancing the work racks along the rail sections, the improvement comprising a selective work-handling means disposed adjacent the elevator chassis and a movable rail section thereon over one of the treating stations for removing selected ones of the work racks from the movable rail section when in the raised position and selectively lowering and raising the work rack over the treating station and repositing the rack on the raised rail section, means on said work-handling means coacting with means on the chassis for guiding and laterally moving the work-handling means out of the path of travel of the chassis during the up and down movement thereof, means on said work-handling means coacting with cam means on the pusher means for moving said work-handling means out of the path of travel of the work racks on the movable rail section when in the raised position during the advancing movement of the pusher means, said selective work-handling means selectively operable in response to the elevating movement of selected ones of the work racks.

8. In a conveying machine for successively conveying a plurality of work racks through a series of treating stations including an elevator chassis movable to and from a raised position and a lowered position over the treating stations, an alignable series of rail sections including movable sections carried by the chassis having a plurality of work racks movably mounted thereon, and pusher means on the chassis for advancing the work racks along the rail sections, the improvement comprising a selective work-handling mechanism removably mounted over one of the treating stations adjacent to the elevator chassis, said mechanism comprising an upright framework pivotally mounted at the lower portion thereof and extending upwardly and over the treating station adjacent to a movable rail section, roller means on the chassis coacting with track means on said framework for guidably supporting and for laterally pivoting said framework out of the path of travel of the chassis during the up and down movement thereof, roller means on the upper portion of said framework coacting with cam means on the pusher means to laterally pivot the framework outwardly out of the path of travel of work racks along the adjacent movable rail section when in the raised position during the advancing movement of the pusher means, flexible conveying means on said framework having lifting means thereon adapted to successively engage selected ones of the work racks on the raised movable rail section adjacent thereto, drive means for driving said conveying means and lifting means thereon so as to remove and selectively and independently lower and raise a selected work rack over the treating station and redeposit the work rack on the movable rail section adjacent thereto when in the raised position, said drive means selectively operable in response to means on said framework actuable by presettable means on the work racks during the elevating movement of the chassis, and control means for coordinating the operating sequence of the conveying machine and said mechanism.

9. In a conveying machine for successively conveying a plurality of work racks through a series of treating stations including an elevator chassis movable to and from a raised position and a lowered position over the treating stations, an alignable series of rail sections including movable sections carried by the chassis having a plurality of work racks movably mounted thereon, and pusher means on the chassis for advancing the work racks along the rail sections, the improvement comprising a selective work-handling mechanism mounted at one of the treating stations adjacent to the elevator chassis, said mechanism comprising an upright framework including a pair of longitudinally spaced side members pivotally mounted at the lower ends thereof for pivoting about an axis substantially parallel to the movable rail section adjacent thereto, track means on each of said side members coacting with rollers on the chassis for guidably supporting and laterally pivoting said framework out of the path of travel of the chassis during the up and down movement thereof, a cam follower on said framework coacting with a longitudinally reciprocable cam on the pusher means for laterally pivoting said framework out of the path of travel of work racks on the movable rail section adjacent thereto when in the raised position during the advancing movement of the pusher means, a plurality of sprockets rotatably mounted on each of said side members, continuous chain means extending around each plurality of said sprockets and disposed in parallel spaced planes substantially perpendicular to the movable rail section, lifting means extending longitudinally between and connected to said chain means for engaging selected ones of the work racks on the adjacent movable rail section, reversible motor means for driving said chain means for laterally removing and for selectively and independently lowering and raising successive selected ones of the work racks over the treating station and redepositing the selected racks on the raised movable rail section, means on said framework actuable by means on said chain means for controlling the movement thereof, said mechanism operable in response to sensing means on said framework actuable by presettable means on the work racks during the elevating movement thereof, and control means for coordinating the operation of the conveying machine and said mechanism.

10. In a conveying machine for successively conveying a plurality of work racks through a series of treating stations, the combination comprising an aligned series of rail means for concurrently supporting a plurality of work racks movably mounted thereon over the treating stations, elevating means movable to and from a raised position and a lowered position for raising and lowering portions of said rail means and work racks thereon over the treating stations, advancing means for successively advancing said work racks along said rail means, a selective work-handling mechanism disposed adjacent to said rail means at one of said treating stations and guidably connected to said elevating means for lateral movement thereby to a clearance position in response to the ascending and descending travel of said elevating means, said mechanism including conveying means thereon for successively removing selected ones of said work racks from said rail means and moving said racks laterally thereof and out of the ascending and descending path of travel of said rail means and selectively lowering and raising said selected work racks above the treating station independently of the movement of said elevating means and depositing said rack on said rail means in the original sequence, and control means for coordinating the operating sequence of said conveying machine and said selective work-handling mechanism.

11. In a conveying machine for successively conveying a plurality of work racks through a series of treating stations, the combination comprising an aligned series of rail means for concurrently supporting a plurality of work racks movably mounted thereon over the treating stations, elevating means movable to and from a raised position and a lowered position for raising and lowering portions of said rail means and work racks thereon over the treating stations, pusher means for successively advancing said work racks along said rail means, a selective work-handling mechanism disposed adjacent to said rail means at one of said treating stations and guidably connected to said elevating means for lateral movement thereby to a clearance position in response to the ascending and descending travel of said elevating means, said mechanism including conveying means thereon for successively removing selected ones of said work racks from a raised portion of said rail means and moving said racks laterally thereof and out of the ascending and descending path of travel of said rail means and selectively lowering and raising said selected work racks above the treating station independently of the down and up movement of said elevating means and depositing said rack on a raised portion of said rail means in the original sequence, said selective work-handling mechanism selectively operable in response to the elevating movement of selected ones of said work racks, and control means for coordinating the operating sequence of said conveying machine and said selective work-handling mechanism.

12. In a conveying machine for successively conveying a plurality of work racks through a series of treating stations, the combination comprising an aligned series of rail means for concurrently supporting a plurality of work racks movably mounted thereon over the treating stations, elevating means movable to and from a raised position and a lowered position for raising and lowering portions of said rail means and work racks thereon over the treating stations, pusher means for successively advancing said work racks along said rail means, a selective work-handling mechanism disposed adjacent to said rail means at one of said treating stations and guidably connected to said elevating means for lateral movement thereby to a clearance position in response to the ascending and descending travel of said elevating means, said mechanism including conveying means thereon for successively removing selected ones of said work racks from a raised portion of said rail means and moving said racks laterally thereof and out of the ascending and descending path of travel of said rail means and maintaining said selected racks in the raised position above the treating station during the down and up travel of said elevating means and thereafter depositing said selected racks on a raised portion of said rail means in the original sequence, and control means for coordinating the operating sequence of said conveying machine and said selective work-handling mechanism.

References Cited in the file of this patent
UNITED STATES PATENTS

| | | |
|---|---|---|
| 1,906,036 | Wunderlich | Apr. 25, 1933 |
| 2,591,681 | Davis | Apr. 8, 1952 |
| 2,605,882 | Curtis | Aug. 5, 1952 |
| 2,928,519 | Finston | Mar. 15, 1960 |